United States Patent [19]

Hudspeth

[11] Patent Number: 4,639,109

[45] Date of Patent: Jan. 27, 1987

[54] OPTICAL ACCESSORY FOR PHOTOGRAPHIC APPARATUS

[75] Inventor: William Hudspeth, Norwell, Mass.

[73] Assignee: Polaroid Corporation, Cambridge, Mass.

[21] Appl. No.: 740,852

[22] Filed: Jun. 3, 1985

[51] Int. Cl.$^4$ .................. G03B 11/00; G02B 7/00
[52] U.S. Cl. ..................... 354/295; 350/318
[58] Field of Search ............ 354/122, 295, 296; 350/318

[56] References Cited

U.S. PATENT DOCUMENTS

| | | | |
|---|---|---|---|
| 3,015,982 | 1/1962 | Bing et al. ................... | 88/1 |
| 3,747,490 | 7/1973 | Brandt ........................ | 354/295 |
| 3,759,153 | 9/1973 | Aimo et al. .................. | 354/295 |
| 3,882,517 | 6/1975 | Land et al. ................... | 354/295 |
| 3,962,711 | 6/1976 | Cutler ......................... | 354/295 |
| 3,994,008 | 11/1976 | Land et al. .................. | 354/295 |
| 4,302,078 | 11/1981 | Stravitz ...................... | 350/318 |
| 4,381,885 | 5/1983 | Coquin ....................... | 350/318 |
| 4,383,735 | 5/1983 | Stravitz ...................... | 354/295 |
| 4,390,242 | 6/1983 | Tatsumi ...................... | 350/318 |
| 4,443,061 | 4/1984 | Coquin ....................... | 350/318 |
| 4,502,760 | 3/1985 | Alfille ......................... | 350/318 |
| 4,508,441 | 4/1985 | Launie ........................ | 354/217 |
| 4,563,063 | 1/1986 | Coquin ....................... | 350/318 |

*Primary Examiner*—A. A. Mathews
*Attorney, Agent, or Firm*—Leslie J. Payne

[57] ABSTRACT

The present invention is directed to an optical accessory for use with photographic apparatus. The accessory is releaseably coupled to the lens system and can releaseably support a plurality of optical elements in relation to the lens system.

5 Claims, 5 Drawing Figures

OPTICAL ACCESSORY FOR PHOTOGRAPHIC APPARATUS

BACKGROUND OF THE INVENTION

The present invention relates to optical accessories for use in conjunction with photographic apparatus.

Various kinds of optical accessories for use with photographic apparatus are well-known. For improving the quality of photographs several filters are available which provide, for instance, correction, polarizing and color compensating features. Moreover, there are several kinds of lenses which provide among other features close-up or telephoto functions. It is evident that a wide variety of optical accessories are available for improving not only the quality of photographs, but also enhancing the creativity of the photographer.

Towards the end of facilitating convenient use of these accessories, it is important to permit their easy mounting and demounting. Also, it is desirable to make them so as to be non-interfering with other camera functions. Such requirements are often difficult to obtain, especially if the cameras to which they are to be used with are compact. This seems especially true of self-developing or instant cameras, in general, and folding or collapsing instant cameras in particular. With regard to the latter there is usually provided a relatively small lens housing mounting on the front face thereof, an objective lens assembly, a photocell window, an exposure cycle start button, a flash window and, in some cases a sonar ranging transducer. A further complicating factor with cameras of this type is the fact that the lens window is recessed from the housing surface. Furthermore, from a versatility standpoint, it is important to allow these accessories to accommodate several selected filters and/or lenses in a secured position while at the same time permitting easy attachment and detachment.

Previous attempts to provide removable optical accessories for use with cameras of the self-developing type are described generally in commonly assigned U.S. Pat. Nos.: 3,015,982; 3,759,153; 3,747,490; and 3,962,711.

SUMMARY OF THE INVENTION

It is an object of the present invention to provide an improved optical accessory for use with photographic apparatus particularly that of the self-developing kind.

Towards that end and according to the present invention there is provided an optical accessory which is selectively coupled to a camera or photographic apparatus. The camera is of the kind having an objective lens assembly, a first housing structure having a portion projecting in a direction forwardly of and on one side of the lens assembly and a second housing structure having a portion extending in a direction forwardly of and on the other side of the lens assembly. The camera's second housing structure being provided with a recess, the accessory includes a frame defining an opening and means for mounting or holding an optical element aligned with its said opening. Means are provided for releasably attaching the accessory to the camera with its said frame opening disposed in alignment with the camera's lens assembly such that an optical element positioned in the mounting means is in operative optical relationship with respect to the lens assembly. The attaching means includes a resiliently flexible member extending from the said frame and includes a first section configured to seat in the recess of the camera's second housing structure in a latching manner while simultaneously yieldably urging and seating a section of said frame against the camera's first housing structure. A distal end section extends from the first section of the resiliently flexible member and is configured to project forwardly of the camera's recess and the accessory frame in a location outside the field of view of the camera's lens assembly when the accessory is attached to the camera so as to be accessible to an operator's finger to facilitate his selective detachment of the accessory from the camera.

In an illustrated embodiment, the mounting means comprises a pair of generally parallel slots each of which is sized and configured to receive therein an optical element. For facilitating the entry and retention of the optical elements a wall portion of the mounting means is flexibly resilient and has a retaining recess formed therein. The retaining recess is adapted to have a snug snap-fit with a complementary shaped projection formed on the optical element.

Among the other objects of the invention are, therefore, the provision of an optical accessory for use in conjunction with a photographic apparatus especially of the self-developing type; the provision on an optical accessory which is extremely versatile insofar as it can easily accept and secure several lenses and/or filters; the provision of an optical accessory of the type noted which is easily attachable and detachable; and, the provision of an optical accessory of the foregoing type which does not interfere with other photographic functions.

Other objects and further scope of applicability of the present invention will become apparent after reading the detailed description taken in conjunction with the accompanying drawings wherein like structure is indicated by like reference numerals.

DETAILED DESCRIPTION

Figure 1:
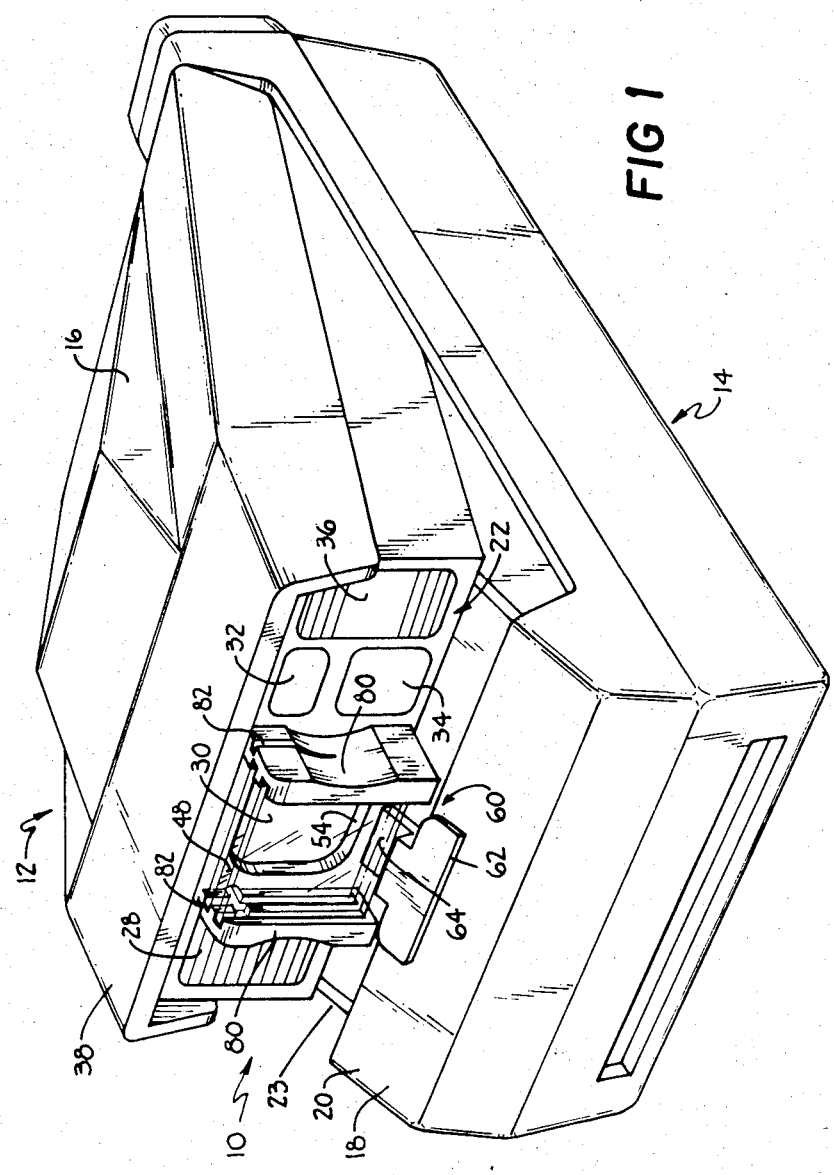
FIG. 1 is a perspective view of an optical accessory, made in accordance with the present invention, mounted on a photographic apparatus.

Reference is now made to the FIGS. 1-5 of the drawing showing an improved optical accessory 10 embodying the principles of the present invention. The accessory 10 is adapted to be selectively coupled to a folding type of self-developing camera 12 such as of the kind more particularly shown and described in commonly assigned U.S. Pat. No. 4,508,441. Inasmuch as the camera 12, per se, does not form an integral aspect of the present invention a detailed description thereof will be omitted. However, those portions of the camera 12 which are necessary for purposes of understanding and describing the present invention will be set forth.

Figure 2:
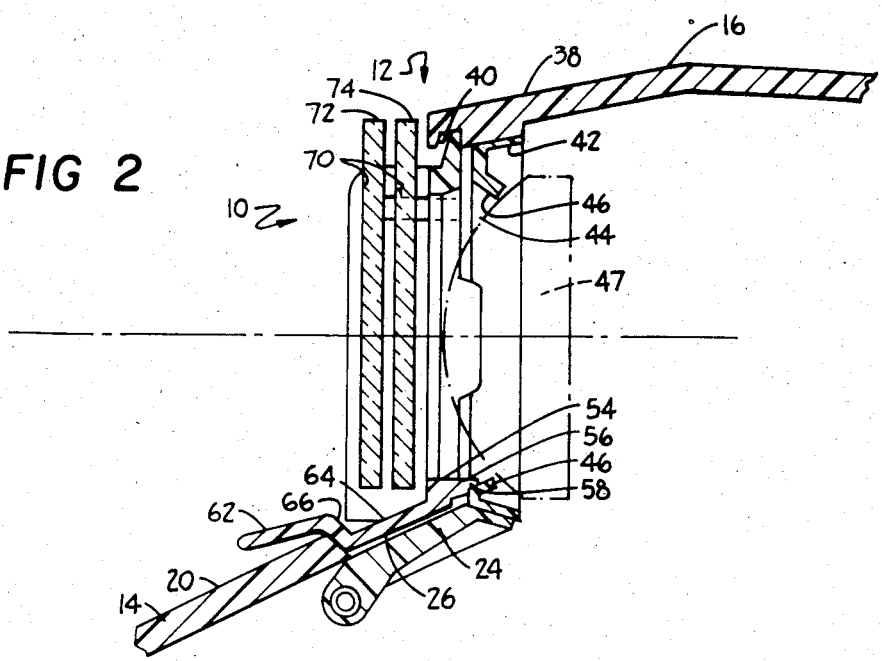
FIG. 2 is a cross-sectional view of the optical accessory in the mounted condition.

Basically, the camera 12 includes a first housing portion 14 and a second housing portion 16, the latter of which has one end pivotally attached to the first housing portion. As best shown in FIG. 1, the first housing portion 14 has a leading end wall 18 which includes an outwardly and rearwardly slanting portion 20. The slanting portion 20 terminates before a component module 22 of the camera 12, (FIG. 2). A gap 23 between the end of the slanting portion 20 and the leading face of the module 22 is closed by a pivotal plate 24 which is pivoted to the first housing portion 14 (FIG. 2). A transversely extending bottom recess 26 is defined above the pivotal plate 24, the front face of the module 22, and the slanting portion 20.

As best shown in FIG. 1, the front face of the module 22 includes a sonar type range finder 28, a lens assembly 30, a photocell 32, a viewfinder window 34 and a strobe 36. As shown best in FIG. 2, the second housing portion 16 includes a top wall 38 having a longitudinally extending upper recess 40 along the forward portion of the top wall. As will be explained subsequently, both the recesses 26 and 40 are adapted to releasably cooperate with the accessory 10 in a manner to be described. Formed inwardly of the front surface of the module 22 is a lens assembly of the housing portion 16 having a lens mounting 42 defining an access opening 44 and inwardly converging surfaces 46. The objective lens element 47 bears against the lens mounting device 42 as shown in FIG. 2.

Reference is now made to the optical accessory 10. It is seen that the optical accessory 10 is an integrally formed one-piece member which is releasably coupled to the camera. It comprises a generally rectangular frame unit 48 defining a central aperture 50, which when the accessory 10 is mounted, surrounds the lens element 47 so as not to hinder the field of view of the latter. Projecting upwardly from the frame 48 is a locating tab 52 which is adapted to fit within the upper recess 40, such as shown in FIG. 2. The tab 52 has a vertical dimension which causes the resilient plastic wall 38 to deflect slightly upwardly when the accessory 10 is being mounted. In such a manner, the inherent resiliency of the plastic housing 16 is effective to bear down on the optical accessory 10 and facilitate retention of the latter in the mounted condition.

Returning back to the frame 48, it includes a generally thin walled frame portion 54, the significance of which will be described presently. Rearwardly projecting from the transverse member 54 is a locating projection 56. Formed at the distal end of the locating member 56 is a raised surface defining a shoulder 58. The shoulder 58 is adapted to bear against the lower converging surface 46 when the accessory is mounted (FIG. 2). This limits forward movement of the accessory 10 and serves to properly locate it in relationship to the camera 12.

Extending from the front of the frame member 48 is a flexible and resilient cantilevered release member 60 having at its distal end an enlarged surfaced finger engageable portion 62. Formed intermediate the release member 60 is an interfitting portion 64 which is adapted to have a snug coupled engagement between the end of the slanting portion 20 and the lens mount 42; such as best shown in FIG. 2. The interfitting portion 64 extends downwardly at an oblique angle, in cantilevered fashion, from the transverse member 54 and defines an upstanding wall engaging portion 66. A pair of resilient biasing arms 67 (FIGS. 4 and 5) face outwardly from the rear of the transverse member 54 and extend towards each other. When the accessory 10 is mounted, the arms 67 are compressed slightly so that they act against the lens mounting 44 to urge the interfitting portion 64 into a snug-type coupled engagement with the recess 26. The dimension from the free ends of the biasing arms 67, in an unflexed condition, to the wall engaging portion 66 is slightly larger than the width of the recess 26. It being understood that the shoulder 58 has a firm interfitting relationship with the converging surface 46. Both the finger engageable portion 62, and the interfitting portion 64 are at oblique angles to the transverse member 54 so as to avoid interfering with the field of view of the lens 47.

For effecting release of the accessory 10 from the camera 12, the finger engageable portion 62 is lifted. This effects a lifting of the thin-walled frame portion 54 such that the shoulder 58 rides off the surface 46 and the biasing arms 67 no longer contact the lens mount 42, thereby freeing the biasing arms. As a consequence, the accessory 10 can be removed easily from the recess 26.

Figure 3:
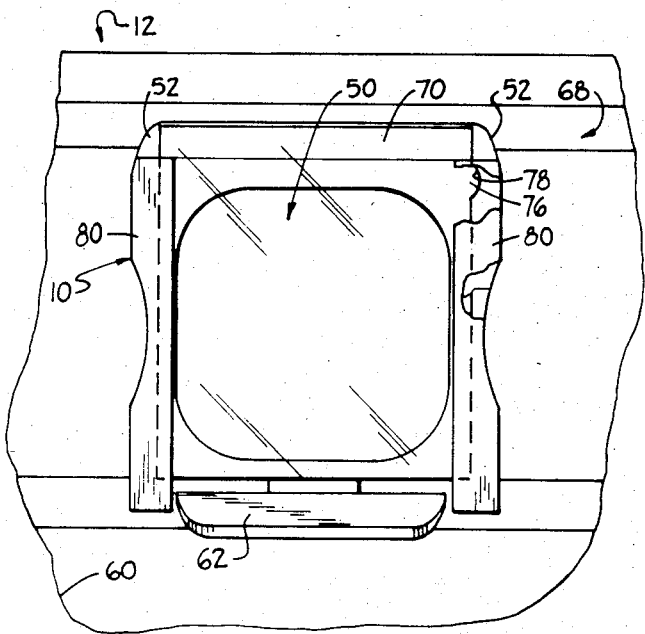
FIG. 3 is an elevational view of the mounted accessory with parts broken away.
Figure 4:
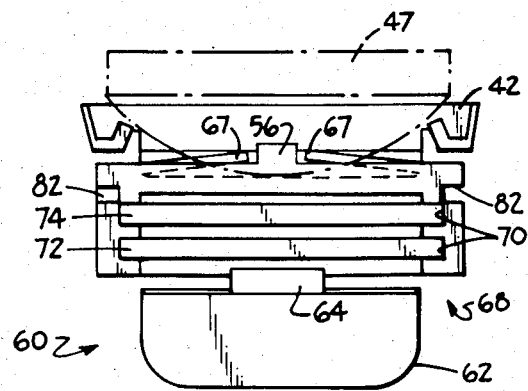
FIG. 4 is a plan view of the optical accessory shown carrying a pair of optical elements.
Figure 5:
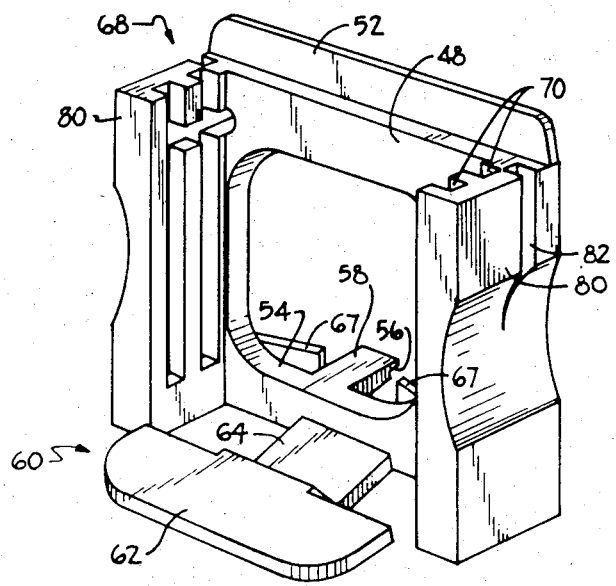
FIG. 5 is an enlarged perspective view showing the optical accessory in somewhat greater detail.

Reference is now made to optical holding or mounting means 68. In this embodiment, the optical holding means 68 includes a pair of generally slots 70 which is adapted to hold optical elements 72,74. In this embodiment, the optical elements 72,74 can be either lenses and/or filters. It is noted that the optical elements 72,74 have a generally rectangular configuration so that they can be received slidably in the slots 70. For releasably retaining the optical element 72,74 in their positions, each is provided with a rounded projection 76. The projections 76 mate with corresponding cut-outs 78 in the side walls 80 of the holding means. The side walls 80 are flexibly resilient and provided with slots 82. Each slot 82 facilitates outward flexure of the side wall 80. Thus, when a projection 76 engages the slot it forces the side wall outwardly until the projection 76 can mate with the cut-out 78 (FIG. 3). Once the projection 76 is received in the cut-out 78 (FIG. 3) the inherent resiliency of the side wall 80 effects a snug snap-fit engagement with the corresponding optical element. Thus, the elements 72,74 can be positively retained in their desired position. Removal of the optical elements is attained by lifting upwardly on them.

Based on the foregoing, it is believed the structure and operation of the optical accessory 10 are evident from the description given above.

Since certain changes may be made in the above-described accessory without departing from the scope of the invention herein involved, it is intended that all matter contained in the description or shown in the accompanying drawings shall be interpreted as illustrative and not in a limiting sense.

What is claimed is:

1. An accessory for a photographic apparatus, the apparatus including an objective lens assembly, a housing structure being provided with a recess adjacent the lens assembly, said accessory including:

a frame defining an opening, said frame including means for mounting an optical element in operative relationship with said opening; and, means for releasably attaching said frame to the photographic apparatus so that said frame opening is disposed in general alignment with the lens assembly such that an optical element positioned in said mounting means is in operative optical relationship with respect to the lens assembly;

said attaching means including at least a resiliently flexible member extending from said frame, said member having a section configured to seat in the recess of the housing structure in coupled engagement therewith and a distal end section configured to project forwardly of the housing structure in a location outside the field of view of the lens assembly when said accessory is attached to the photographic apparatus so as to be accessible to an operator's finger to facilitate selective release of said accessory from the photographic apparatus.

2. The accessory of claim 1 wherein said mounting means includes at least a pair of slots each of which slidably receive therein an optical element.

3. The accessory of claim 2 wherein said mounting means includes at least a flexible and resilient wall which, in part, defines said slots, and said wall includes cut-outs formed adjacent each of said slots, said cut-outs being sized and configured to cooperate respectively with a projection formed on a respective optical element, such that the projection deflects said wall outwardly when the element is slid into said slot until the projection cooperates with one of said cut-outs, whereby said wall portion effects a snap-fit engagement of the projection.

4. The accessory of claim 3 further including a locating tab projecting from a side of said frame opposite said member and adapted to have a cooperating relationship with a recess of the housing structure.

5. An optical accessory for releasable coupling to a photographic apparatus of the type including a housing portion having a lens assembly and recesses in the housing portion formed adjacent the lens assembly, respectively, said accessory comprising:

a frame defining an aperture for the lens assembly;

a flexible and resilient cantilevered release member projecting from a side of said frame, said cantilevered member having a finger engageable portion formed at the distal end thereof which is out of the field of view of the lens assembly and an intermediate interfitting portion insertable in the recess;

biasing means on said frame portion for contacting the housing portion and applying a yieldable force to releaseably retain said interfitting portion in the recess thereby coupling said accessory to the photographic apparatus;

said finger engageable portion being displaceable to effect a release of said yieldable force by displacement of said frame and said biasing means, thereby facilitating removal of said interfitting portion from the recess; and, means for releasably mounting an optical element in overlying relationship to said aperture.

* * * * *